US008047914B2

(12) United States Patent
Morrow

(10) Patent No.: US 8,047,914 B2
(45) Date of Patent: Nov. 1, 2011

(54) PLAYER VERIFICATION SYSTEM

(75) Inventor: James W. Morrow, Sparks, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 573 days.

(21) Appl. No.: 11/212,532

(22) Filed: Aug. 25, 2005

(65) Prior Publication Data

US 2008/0254877 A1 Oct. 16, 2008

(51) Int. Cl.
*A63F 13/00* (2006.01)
*G06K 9/00* (2006.01)
(52) U.S. Cl. ......... 463/29; 382/115; 382/116; 382/117; 382/118; 382/119; 382/120; 382/121; 382/122; 382/123; 382/124; 382/125; 382/126; 382/127; 382/209; 463/25
(58) Field of Classification Search ............... 463/25, 463/29; 382/115–127, 209
See application file for complete search history.

(56) References Cited

U.S. PATENT DOCUMENTS

| | | | | |
|---|---|---|---|---|
| 5,763,837 A | * | 6/1998 | Davignon et al. | 174/113 R |
| 6,363,485 B1 | * | 3/2002 | Adams et al. | 713/186 |
| 2002/0132663 A1 | * | 9/2002 | Cumbers | 463/25 |
| 2003/0068072 A1 | * | 4/2003 | Hamid | 382/124 |
| 2003/0191952 A1 | * | 10/2003 | Anderson et al. | 713/189 |
| 2003/0228901 A1 | * | 12/2003 | Walker et al. | 463/25 |

* cited by examiner

*Primary Examiner* — Peter DungBa Vo
*Assistant Examiner* — Jeffrey Wong
(74) *Attorney, Agent, or Firm* — Philip J. Anderson; Steptoe & Johnson, LLP

(57) ABSTRACT

A method and system for verifying the continued presence of the same player at a gaming machine is provided. The system comprises a device for continuously obtaining verification data samples, wherein each verification data sample relates to one or more physical features of a first player. A subsequently obtained verification data sample is analyzed to determine whether it is substantially similar to a previously obtained verification data sample. If the subsequent verification data sample is substantially similar to the previously obtained verification data sample, then the system determines that the first player continues to be the same player present at the gaming machine.

12 Claims, 3 Drawing Sheets

PLAYER VERIFICATION SYSTEM

Embodiments disclosed herein generally relate to a system and method for verifying the presence of a user.

BACKGROUND

Currently there are various ways to monitor and track player activity in a casino environment. One common method for monitoring casino players is via a player tracking system. Typically, these systems use cards to identify players and the player inserts the card before playing a game on the casino gaming machine. The player tracking system uses the information stored on the card to identify the player. Once the player tracking system identifies the player, the system then monitors the player's gaming habits. This includes recording player wagered amounts and the rate at which the player plays the games, and the like. Data relating to the player's gaming habits is then stored in a player tracking system database and/or on the player tracking card. Additionally, the player tracking cards can store player biographic information, such as player name, address, birth date, and the like.

Despite the advantages of using player tracking cards, there are problems associated with the use of such cards. One problem arises when a first player walks away from a gaming machine without first retrieving the card he inserted into the machine when play began. When a second player begins playing on the same gaming machine, the player habits of the second player will be attributed to the first player. Another problem occurs when a first player allows a second person to use the first player's tracking card. In this scenario, the first player accrues tracking points that are not actually earned by him as the player tracking system inaccurately records and associates the data as first player information. Additionally, another problem occurs when a player temporarily stops playing the machine. The player has a certain amount of time to resume play, or else the playing session may be ended by the player tracking system and the player loses "time of play" credit.

What is needed, therefore, is a system able to periodically and non-intrusively verify that the same player is continuing to play during a particular gaming session.

BRIEF SUMMARY

Briefly, and in general terms, various embodiments for verifying the continued presence of a machine operator are disclosed herein. One embodiment is directed to a method for verifying the continued presence of a player at a gaming machine during a gaming session. The method comprises activating a gaming session on a gaming machine and triggering a mechanism to continuously obtain verification data samples. The verification data samples relate to one or more physical features of a first player. A first verification data sample is obtained from a first player and designated as a reference template. A second verification data sample is then obtained during the gaming session and is analyzed to determine whether the second verification data sample is substantially similar to the reference template. If the second verification data sample is substantially similar to the reference template, the system determines that the first player continues to be present at the gaming machine during the gaming session. Thereafter, the system additionally updates the reference template by designating the second verification data sample as the new reference template.

An alternate embodiment provides a method for verifying the continued presence of a player at a gaming machine during a gaming session. The method comprises activating a gaming session on a gaming machine and obtaining a first verification data sample from a first player. A second verification data sample is obtained during the gaming session and is analyzed in view of the first verification data sample. The analysis comprises determining whether the second verification data sample is substantially similar to the first verification data sample. If the second verification data sample is substantially similar to the first verification data sample, the system concludes that the first player continues to be present at the gaming machine during the gaming session, and the system continues to obtain verification data samples. Thereafter, the most recently obtained verification data sample is analyzed in view of the immediately previous obtained verification data sample to determine whether the most recently obtained verification data sample is substantially similar to the previously obtained verification data sample.

An optional embodiment provides a gaming machine having a thermal imager. The thermal imager continuously obtains thermal images of a target area adjacent to the gaming machine. Once the gaming session is activated and information that identifies a first player is received, a first thermal image of the target area is obtained. The thermal image captures the first player positioned within the target area. This first thermal image is designated as a reference image. A second thermal image of the target area is obtained during the gaming session. The second thermal image is analyzed to determine whether the second thermal image is substantially similar to the reference image. If the second thermal image is substantially similar to the reference image, the system determines that the first player continues to be present during the gaming session, and thereafter, the system updates the reference image by designating the second thermal image as the reference image. The system then continues to obtain subsequent thermal images to perform its analysis, as discussed above.

Another embodiment provides a verification device for verifying the continued presence of the same player at a gaming machine. The device comprises a communication means for connecting to one or more gaming machines and a means for continuously obtaining verification data samples. The verification data samples relate to one or more physical features of a first player. The device further comprises a storage means for storing a designated reference template and an analyzing means for determining whether a particular verification data sample is substantially similar to a reference template. A processing means verifies the continued presence of the first player and thereafter, updates the reference template if the particular verification data sample is substantially similar to the reference sample.

Another embodiment provides a method for verifying the continued presence of a user of a device. The method comprises activating a device and triggering a mechanism for continuously obtaining verification data samples at predetermined intervals. Each verification data sample relates to one or more physical features of a first user. A first verification data sample for a first user is obtained and designated as a reference template. A subsequent verification data sample is obtained. If the subsequent verification data sample is substantially similar to the reference template, then the system determines that the first user continues to be present during operation of the device and, thereafter, updates the reference template by designating the next subsequent verification data sample as the reference template. The system then continues to obtain additional subsequent verification data samples to perform its analysis, as discussed above.

Optionally, another embodiment provides a method for verifying the continued static condition of a target area adjacent a gaming machine. The method comprises activating a mechanism for continuously capturing verification data samples of the target area. A first verification data sample of the target area is obtained, wherein the first verification data sample relates to one or more physical features of the target area. A second verification data sample of the target area is obtained and is analyzed in view of the first verification data sample. The analysis comprises determining whether the second verification data sample is substantially similar to the first verification data sample. If the second verification data sample is substantially similar to the first verification data sample, the system determines that the target area continues to be in a static condition, and the system continues to obtain subsequent verification data samples. Thereafter, the last obtained verification data sample is analyzed in view of a previously obtained verification data sample.

These and other features and advantages of the present invention will become apparent from the following detailed description, taken in conjunction with the accompanying drawings, which illustrate by way of example, the features of the present invention.

DETAILED DESCRIPTION

Various embodiments are directed to a system for monitoring the presence of a player for use in a casino gaming environment. More particularly, the monitoring system verifies the continued presence of a particular player during a gaming session on a gaming machine. Generally, the player verification system employs passive or unobtrusive sensing methods to obtain or acquire information pertaining to one or more player attributes or characteristics. The information is obtained while the player interacts with the gaming machine or gaming system such that no overt action is required by the player. The information is continuously obtained and is used to verify the presence of the game player.

The player verification system provides a safeguard to casinos by verifying that the first player continues to be present and it is the same first player that remains at the gaming machine while playing a game. Additionally, the player verification system prevents other players from assuming the first player's gaming session. Accordingly, a second player may not accrue player points for a first player. Embodiments of the system and method are illustrated and described herein, by way of example only, and not by way of limitation.

Figure 1:
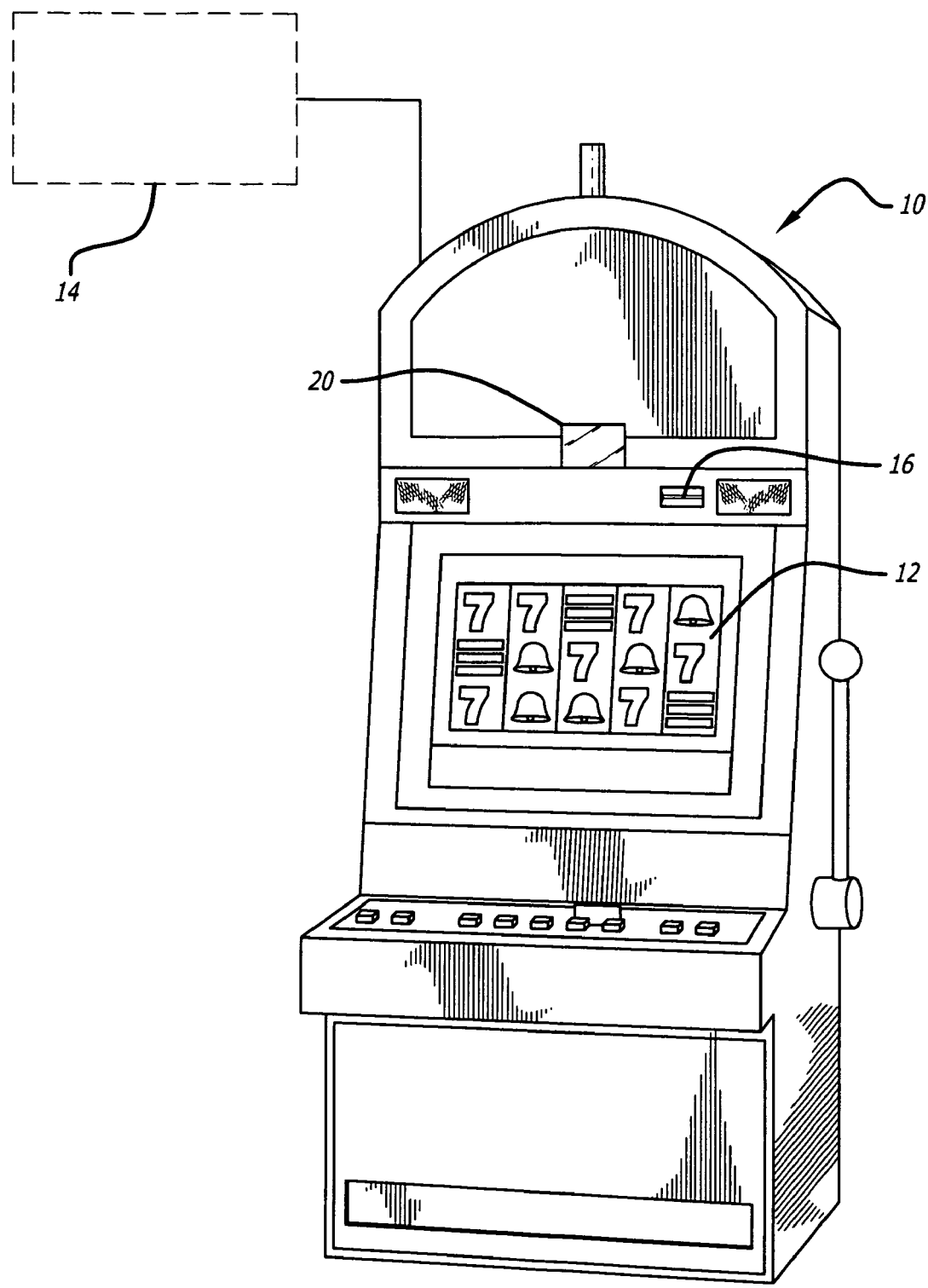
FIG. 1 is an illustration of a gaming machine comprising an embodiment of the continued presence verification system.

Referring now to the drawings, wherein like reference numerals denote like or corresponding parts throughout the drawings and, more particularly to FIGS. 1-2, there is shown various embodiments of a player presence verification system.

Referring now to FIG. 1, a gaming machine 10 having a display 12 is shown. In various embodiments, the display 12 is a viewing area such as, but not limited to, a set of mechanical spinning reels, a CRT (cathode ray tube), or a thin panel display. Examples of thin panel displays include plasma, LCD (liquid crystal display), electroluminescent, vacuum fluorescent, field emission, or any other types of thin panel displays known or developed in the art. In various embodiments, the gaming machine 10 may be a mechanical reel spinning slot machine, video slot machine, video poker machine, keno machine, video blackjack machine, or a gaming machine offering one or more of the above described games.

Generally, the gaming machine 10 also comprises a gaming mechanism (not shown), which provides a game for play on the gaming machine 10. Alternatively, the gaming mechanism provides a plurality of games for play on the gaming machine 10.

In another embodiment, one or more gaming machines 10 are in communication with a player tracking system 14. The player tracking system 14 allows a casino to monitor the gaming activities of various players. Additionally, the player tracking system 14 is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system 14 is operatively connected to one or more input components on the gaming machine 10. These input components include, but are not limited to, a slot for receiving a player tracking card, a keypad or equivalent, an electronic button receptor, a touch screen and the like. The player tracking system 14 may also include a database of all qualified players (i.e., those players who have enrolled in a player rating or point accruing program). Generally, the database for the player tracking system 14 is separate from the gaming machines 10.

In one embodiment, one or more gaming machines are connected to a casino gaming system via a system network. One or more servers or databases are connected to the casino gaming system. In one embodiment, the player tracking system is in communication with the casino gaming system. In another embodiment, the player tracking system is stored on a server on the casino gaming network. Additionally, a player verification system is in communication with the casino gaming system via the system network.

Referring back to FIG. 1, the gaming machine 10 includes a player tracking card slot 16. A player begins a gaming session and inserts a player tracking card into the card slot 16. A card reader (not shown) within the gaming machine 10 reads the information from the inserted player tracking card and identifies the first player. After the gaming session begins, an initial or first player verification data sample is obtained from the identified first player.

The verification data sample obtained by the verification system is information relating to one or more physical characteristics of the first player. Examples of the verification data sample include, but are not limited to, a thermal image, an image from a camera, an image from a video camera, an image from an image capturing device, a retinal scan, an iris scan, a voice sample, a fingerprint, a weight measurement, an electronic field image, and other types of biometric data samples well-known by those skilled in the art.

The initial verification data sample is a reference for verifying other data samples. During the gaming session, one or more subsequent verification data samples are obtained, and each subsequently obtained verification data sample is analyzed. The analysis comprises comparing each subsequently obtained verification data sample to the initial verification data sample (i.e. the reference template). If the subsequent verification data sample matches the initial verification data sample, then the gaming machine determines that the same first player identified at the start of the gaming session is still the same player playing on the gaming machine. If the subsequent verification data sample does not match the initial verification data sample, then the verification system cannot verify that the identified first player is still playing on the gaming machine. Accordingly, the gaming session may be suspended and/or casino representatives may be alerted. Optionally, if the verification system cannot verify that the same player is still playing, the verification system may obtain another verification data sample to either confirm the absence or the presence of the first player.

Furthermore, to be determined a "match" the data samples are not required to be identical. Some technologies such as thermal images or weight measurements can be expected to have variations over short periods of time such that absolute comparisons will not be possible. Therefore, a predetermined amount of variance between images is allowed when determining whether the data samples match.

One embodiment utilizes a processor to perform a 'most likely' form of comparison between data samples. In this regard, a processor compares the data samples and determines that a match exists if the samples are at least 90% similar. Alternatively, another embodiment determines that a match exists if the samples are at least 80% similar. Optionally, another embodiment determines that a match exists if the samples are a minimum of 70% similar. As one skilled in the art will appreciate, the boundaries for determining a match may be any value and is a predetermined value set by the manufacturer or casino.

Alternatively, in another embodiment, the initial verification data sample is not the sole reference template. Rather, the reference template is updated as subsequent verification data samples are obtained. Once the gaming session is activated, a mechanism for continuously obtaining verification data samples is triggered and a first verification data sample is obtained from the first player. This first verification data sample is designated as the reference template. As the gaming session continues, subsequent verification data samples are obtained. For example, a second verification data sample is obtained during the gaming session. This second verification data sample is analyzed to determine whether it is substantially similar to the reference template. If the second verification data sample is determined to be substantially similar to the reference template, the system determines that the same first player is still the same player playing on the gaming machine. Additionally, the system, thereafter, updates the reference template by designating the "substantially similar" second verification data sample as a new or second reference template, thereby replacing the initial verification data sample with the second verification data sample. As the gaming session continues another verification data sample (e.g. third verification data sample) is obtained and analyzed. The system determines whether this "third" verification data sample is substantially similar to the reference template. Again, if the verification data samples are substantially similar, then the system determines that the same first player is still the same player playing on the gaming machine and the system, again, updates the reference template by designating the "substantially similar" third verification data sample as the reference template (thereby replacing the previous second reference template with the third verification data sample). Additional verification data samples may be obtained and analyzed in a similar manner. Generally, the analysis comprises comparing the last obtained verification data sample to the reference template, wherein the reference template has been designated as a previously obtained verification data sample (e.g. the "next-to-last" obtained verification data sample).

Optionally, in another embodiment, where two or more verification data samples are obtained or acquired, the analysis comprises determining the amount of difference or variance between the two samples, rather than determining if the samples are substantially similar. For example, after first and second verification data samples are obtained during a gaming session, the data samples are analyzed to determine whether the second verification data sample differs significantly from the first verification data sample. If the second verification data sample does not differ significantly from the first verification data sample, then the system determines that the same player is playing on the gaming machine. However, if the system determines that the second verification data sample does differ significantly from the first verification data sample, the system will not determine that the same player is still playing on the gaming machine.

The obtained verification data samples are not required to be identical. Rather, a certain amount of variance in the samples is anticipated. During the analysis of the samples, a value representing the amount of variance is generated. If the generated value is within an allowable range, the system determines that the analyzed data samples do not differ significantly and the system concludes that the same player is still present at the gaming machine. However, if the generated value falls outside the allowable range, the system determines the analyzed data samples are significantly different, and the system will not verify the continued presence of the same player. The allowable range of variance is a predetermined setting that may be programmed by the casino or manufacturer. Additionally, the allowable range of variance values may be adjusted as needed by the casino.

Figure 2A:
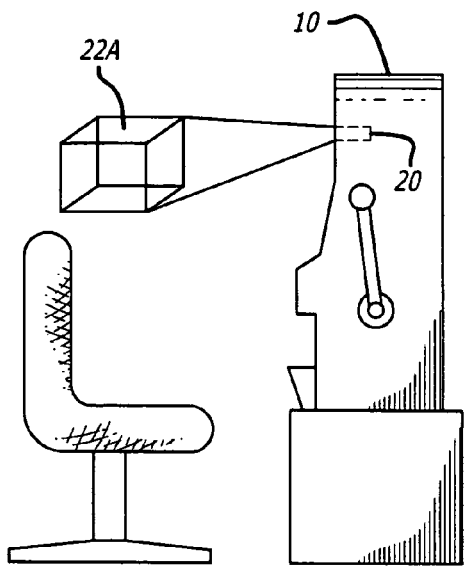
FIG. 2 is an illustration of the side-view of a gaming machine comprising an embodiment of a continued presence verification system.
Figure 2B:
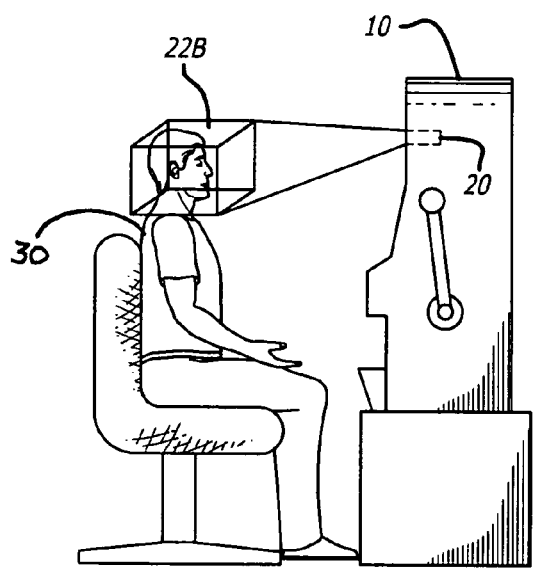

In one embodiment, the gaming machine comprises an infrared camera and the verification data samples are in the form of a thermal image. Referring now to FIG. 2A, an infrared camera 20 is operatively connected to the gaming machine 10 and captures thermal images of a target area 22A adjacent to the gaming machine. In order to play a game on the gaming machine 10, a player must be positioned within the target area 22A. Referring now to FIG. 2B, a first player 30 is positioned within the target area 22B. Once a gaming session is activated, the infrared camera 20 captures a first thermal image of the first player 30. During the gaming session, the infrared camera 20 captures a second thermal image of the target area 22B. The second thermal image is compared to the first thermal image. If the second thermal image is substantially similar to the first thermal image, the system determines that the first player 30 continues to be present at the gaming machine 10 and is the same player still playing a game during the gaming session.

If the second thermal image is not substantially similar to the first thermal image, the system will not verify that the same first player 30 continues to be present at the gaming machine 10. Additionally, in one embodiment, if the system cannot verify that the same first player 30 continues to be present at the gaming machine 10, the system may suspend the gaming session. Optionally, if the system cannot verify that the same first player 30 continues to be present at the gaming machine 10, the system may trigger an alarm to alert casino personnel.

Figure 2C:
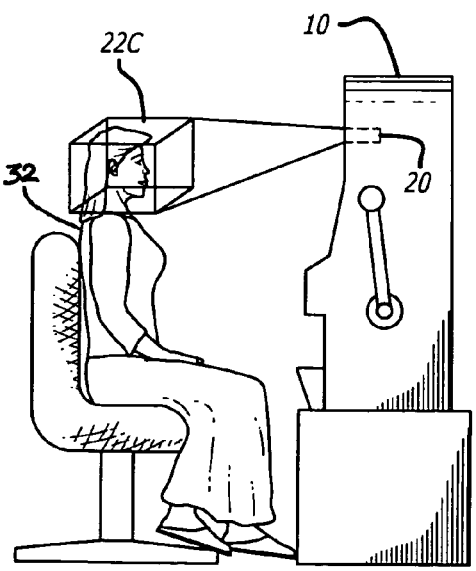

In another embodiment, if the second thermal image is not substantially similar to the first thermal image, the system determines that a second player, different from the first player, is playing on the gaming machine during the gaming session. Referring to FIG. 2C, a second player 32 is positioned in the target area 22C and is playing a game on the gaming machine 10. Alternatively, in another embodiment, if the second thermal image is not substantially similar to the first thermal image, the system determines that no person is present at the gaming machine 10. As illustrated in FIG. 2A, no player is interacting with the gaming machine 10 and accordingly no player is positioned in the target area 22A.

Referring back to FIG. 2B, the infrared camera 20 continues to capture additional images of the target area 22B. The last obtained thermal image is compared to a previously obtained thermal image. For example, the fifth-obtained thermal image may be compared to the fourth-obtained thermal image. Alternatively, the fifth-obtained thermal image may be compared to the third-obtained thermal image. Optionally, the fifth-obtained thermal image may be compared to the second-obtained thermal image, or may be compared to the first-obtained thermal image.

Alternatively, the infrared camera captures a first image and a second image of the target area 22B. The verification system analyzes the first and second images to determine whether the second image differs significantly from the first image. If the system determines the images do not differ significantly, then the system determines that the first player 30 is the same player playing a game during the gaming session. However, if the system determines the images do differ significantly, the system will not verify that the first player 30 is the same player playing during the gaming session.

Generally, the infrared camera comprises uncooled detectors, which use sensors that operate at room temperature. Alternatively, the infrared camera may comprise cooled detectors that are typically contained in a vacuum-sealed case and cryogenically cooled.

Various methods and procedures may be utilized in the analysis of the obtained verification data samples. The analysis provides a means for determining how much a second data sample has changed versus a first data sample. Typically the last obtained data sample is analyzed in view of an earlier obtained data sample (e.g. the next-to-last obtained data sample).

In an embodiment that acquires thermal images, pre-processing procedures may be applied to the acquired images to increase the success of other image processing procedures. Pre-processing typically includes techniques for enhancing contrast, removing noise, and isolating regions whose texture indicate a likelihood of alphanumeric information.

Additional image processing techniques may be applied to the acquired images. In one embodiment, a differential transform is performed to simplify the image detail by selecting out the borders of objects within the image. Next, a set of vertices or critical points of the image are selected. For example, points of high deflection (where a 'line' within the image makes an abrupt change as in a 90 degree corner) may be selected. It is advantageous to have a large number of vertices, (such as 100, for example). However, the initial processing of the image may not provide adequate points. In that case, a second method for obtaining additional vertices may be enabled. For example, the intensity of the image along 'lines' may be used to select additional points. However, those skilled in the art will appreciate that other known procedures for selecting additional points may be utilized.

Optionally, a centering procedure may be applied, wherein the centering procedure matches a first image as closely as possible in the X-Y dimensions and in magnification with a second image in order to align potential vertices.

The same image processing techniques are applied to each acquired image. The resulting selected vertices from a second image are analyzed against the selected vertices from a first image. If a certain percentage of the vertices match, then the first and second images are determined to be substantially similar (meaning they are not significantly different) and the continued presence of the player is verified. In one embodiment, at least 70% of the vertices must match. Optionally, in a different embodiment, 80% of the vertices must match. The minimum requirement may be set by the manufacturer or the casino and is dependent on many factors. For example, the selection of 70% versus 80% (as the minimum % requirement) may depend upon such factors as the environment in which the imaging takes place, the critical nature of the operation, the type of image being taken, the equipment being used to capture the image, the frequency at which the images are captured, and the like.

Optionally, in one embodiment, at least 50% of the vertices are required to match, in order for the images to be determined substantially similar.

Generally, the image is allowed and expected to gradually change, thereby accommodating varying factors such as, but not limited to, environmental heating and cooling, temperature effects of player eating and drinking habits, and the presence of other objects and people in the field of view of the thermal image that can potentially modify the image in some way. Thus, the initial image may be allowed to gradually take on aspects of the latest image in order to accommodate gradual changes.

In another embodiment, the gaming machine includes a camera (not shown). Examples include a digital camera, a video camera, or any other image-capturing device known to those skilled in the art. In one embodiment, the camera is situated such that it captures images of a target area adjacent the gaming machine. The target area is designed to be the area at which a player is positioned while playing a game on the gaming machine. During the gaming session, the camera captures multiple images of the target area, wherein at least one image includes the first player positioned within the target area. Each captured image is analyzed to determine whether the last captured image is substantially similar to a previously captured image. If the images are substantially the same, the verification system concludes that the same first player continues to be present at the gaming machine and the gaming session continues, uninterrupted. If the verification system determines the images are significantly different, then the system cannot verify that the same first player is present and the gaming session may be suspended.

In an alternative embodiment, the gaming machine includes a retinal scanner (not shown). Once the gaming session is activated, a retinal scanner acquires a first retinal scan of the first player. As the gaming session continues, additional retinal scans are acquired. The verification system determines whether the last acquired retinal scan is substantially similar to a previously acquired retinal scan. For example, the system analyzes a second retinal scan to determine if it is substantially similar to a first retinal scan. If the second retinal scan is substantially similar to the first retinal scan, the verification system determines that the same first player continues to be present at the gaming machine and the gaming session continues. If the second retinal scan is not substantially the same as the first retinal scan, then the gaming session may be suspended. Optionally, in a different embodiment, the gaming machine includes an iris scanner instead of a retinal scanner. However, those skilled in the art will appreciate that the system comprising an iris scanner operates in a manner similar to the system comprising a retinal scanner.

Alternatively, in an optional embodiment, the gaming machine comprises both a retinal scanner and an iris scanner.

In an alternative embodiment, the gaming machine includes a retinal scanner and the analysis of the acquired retinal scans comprises analyzing the last acquired retinal scan against a reference template, wherein the reference template is a previously acquired retinal scan. If the last acquired retinal scan is substantially similar to the reference template, the system determines that the same first player continues to be present at the gaming machine and the system updates the current reference template. The reference template is then updated by replacing the current reference template with the "substantially similar" last acquired retinal scan. When the next retinal scan is acquired, it is analyzed against the updated reference template.

In an additional embodiment, the gaming machine includes a voice recognition verification system used in conjunction with an interactive game that involves having the player use his/her voice. The voice recognition verification system comprises a microphone and may also include speakers, amplifiers and other sound related components for recording and/or processing one or more audio samples. Once the gaming session is activated, a first voice sample of the first player is obtained. The voice sample may be a few seconds in duration or any other duration required to obtain a distinct voice sample. For example, the voice sample may be the player reciting his name or repeating a phrase provided by the voice recognition verification system or the gaming system. During the gaming session, a second voice sample is obtained. The system analyzes the second voice sample to determine if it is substantially similar to the first voice sample. If the samples are determined to be substantially similar, the system determines that the same first player continues to be present at the gaming machine and allows the gaming session to continue. If the samples are not substantially similar, the system will not verify the continued presence of the same player and the gaming session may be suspended. As the gaming session proceeds, the system continues to obtain additional voice samples. Each subsequently obtained voice sample is analyzed to determine whether it is substantially similar to a previously obtained voice sample.

Optionally, in another embodiment, a particular voice sample is designated as a reference template. A subsequently obtained voice sample is then analyzed against the designated reference template. If the subsequently obtained voice sample is substantially similar to the reference template, then the continued presence of the same player is verified and the reference template is updated by storing the subsequently obtained voice sample as the new reference template.

Alternatively, in an optional embodiment comprising a voice recognition verification system, the analysis comprises determining the amount of variance in an obtained voice sample. For example, a first and second voice sample are obtained. The system analyzes the last obtained voice sample (e.g. the second voice sample) to determine whether it is substantially similar to the "next-to-last" obtained voice sample (e.g. the first voice sample). If the samples are substantially similar, the system determines that the same first player remains present. If the samples are not substantially similar, the system does not verify the continued presence of the same game player.

In another embodiment, the player verification system includes a fingerprint sensor on the gaming machine. In one embodiment, the sensor is a separate component on the button panel. Alternatively, a fingerprint sensor is integrated into one or more buttons located on the button panel or the handle of the slot machine. For example, the fingerprint sensor may be part of the "spin" reels button or the "max bet" button. During the gaming session, a first fingerprint image of a first player is obtained and recorded. Subsequently, a second fingerprint image is obtained. The system analyzes the second fingerprint image and determines whether it is substantially similar to the first fingerprint image. If the fingerprint images are substantially similar, the verification system determines the same first player continues to be present at the gaming machine and the gaming session continues. If the fingerprint images are not substantially similar, the verification system determines the player is not the same as the first player and the gaming session may be suspended.

Periodically during the gaming session, subsequent fingerprint images of the player are recorded. Each subsequently obtained fingerprint image may be taken when the player contacts the sensor on a button or when the gaming machine prompts the player for a fingerprint. Each subsequently obtained fingerprint image is analyzed. Alternatively, only a portion of the subsequently obtained fingerprint images are analyzed.

Additionally, in an optional environment, the player verification system includes a weight-sensing device. The weight-sensing device obtains weight measurements from the player. In one embodiment, the weight-sensing device is a scale provided on a chair associated with the particular gaming machine. In another embodiment, the weight-sensing device is a scale positioned on the floor in front of the gaming machine. Once the gaming session is activated by a first player, the scale obtains a first weight measurement of the first player. During the gaming session, the scale obtains a second weight measurement. The second weight measurement is analyzed against the first weight measurement. If the weight measurements are substantially similar, the system verifies the continued presence of the same first player. If the weight measurements are not substantially the same, the system does not verify the continued presence of the first player and the gaming session may be suspended.

During the gaming session, subsequent weight measurements are obtained. Generally, the last obtained weight measurement is compared to the next-to-last obtained weight measurement. However, the last obtained weight measurement may be compared to any previously obtained weight measurement. If the compared weight measurements are substantially similar, the system verifies the continued presence of the same game player. And, if the compared weight measurements are not substantially similar, the system does not verify the continued presence of the same player.

In another embodiment, the weight-sensing device is a force-based occupant weight detector that employs piezoresistive strain gauges. The body weight of a player on the weight-sensing device produces strains on the gauges that change the electrical resistance of the gauges, to produce a voltage signal proportional to the weight of the player's body on each sensor. An example of such a device is the microfused silicon strain gauge (MSG) by Texas Instruments Incorporated.

In an alternative embodiment, the weight-sensing device is an integrated circuit using electric field (e-field) imaging. This device generates a low-level e-field from multiple antennas mounted in or near the gaming machine. If a player positions himself/herself within the e-field, then the conductive body of the player is detected by the drop in AC voltage. Optionally, multiple antennas may be positioned such that the height of the player is also detectable. An example of such a device is the e-field imaging chip (the MC33794) by Freescale Semiconductor, Inc.

Optionally, in another embodiment, the player verification system includes radio frequency (RF) transmitters and skin penetration sensors. The RF transmitters generate a RF field in a target area in front of the gaming machine. When a player positions himself within the target area, RF waves penetrate the player's skin and bounce back to sensors positioned on the gaming machine. The chemical and reflective properties of the player's skin produce a particular signature that can distinguish the player from other players.

In another embodiment, a first verification data sample is obtained when a player is issued a player tracking card. In this regard, the data stored on the player tracking card includes at least one of a thermal image, picture, retinal scan, iris scan, voice sample, fingerprint, weight measurement, or other biometric data. Additionally, the player tracking card stores various types of data, including but not limited to, a player's name, date of birth, address, player rating and other types of player biographical data. Once the player inserts the player tracking card into a gaming machine, the player is identified and the gaming session begins. During the gaming session, subsequent verification data samples are obtained from the player. The subsequently obtained verification data samples are each analyzed against the first verification data sample stored on the card. For example, in one embodiment fingerprint data is obtained from the player during the gaming session. The fingerprint data is then analyzed against the fingerprint data stored on the player tracking card.

In an additional embodiment, if the analyzed verification data samples are substantially similar, the gaming session continues and player points accrue and are stored on the first player tracking card and/or in a database. If, however, the compared information is not substantially similar, the gaming session is suspended and no points are accrued for the first player.

Alternatively, if the compared data verification samples are not substantially similar, the player can continue to play the game. However, player points will not continue to accrue and any player gaming habits observed during the gaming session will not be attributed to the first player. Optionally, if the analyzed data verification samples are not substantially similar, the player tracking card is invalidated. In another embodiment, if the analyzed data verification samples are not substantially similar, the player is prompted to enter identifying information in order to continue the gaming session. In another embodiment, in a scenario where the gaming session "times-out," the first player is prompted to provide identifying information in order to resume the gaming session.

In another embodiment, the data relating to player gaming habits that is obtained during a gaming session is transferred, via a network, to a server. The data is then stored and is associated with the particular player. In another embodiment, the obtained data is used to update the player tracking card.

In another embodiment, the system captures or obtains verification data samples at periodic intervals. For example, the system captures verification data samples before, after or between game plays. The periodic intervals are periods of time set by the casino or the manufacturer. For example, the periodic intervals could be five minutes intervals, ten minute intervals, or any other constant time interval. In another embodiment, the system captures verification data samples after predetermined trigger events. For example, the trigger events may include game wins, periods of inactivity, player loss amounts, and a predetermined amount or number of player wagers. Optionally, in an alternative embodiment, the system captures verification data samples at random intervals.

In an optional embodiment, a player tracking system is not included in the verification system. In this example, a player activates a game on a gaming machine. The player may activate the game by inserting money, tokens, tickets, or credits into the gaming machine. However, in this scenario, the gaming session is not activated by the receipt of a player tracking card. Once the gaming session begins, two or more verification data samples are obtained. The last obtained verification data sample is analyzed to determine whether it is substantially similar to a previously obtained verification data sample. If the last obtained verification data sample is substantially similar to the previously obtained verification data sample then the gaming machine concludes that the same first player is still the same player playing on the gaming machine. If the last obtained verification data sample is not substantially similar to the previously obtained verification data sample, then the gaming machine will not verify that the first player is still playing on the gaming machine. Accordingly, the gaming session may be suspended and/or casino representatives may be alerted. Optionally, if the gaming machine cannot verify the first player is still playing, the gaming machine may obtain another verification data sample to confirm the absence or presence of the first player.

In an alternative embodiment, those skilled in the art will appreciate that the gaming machine may include one or more of the aforementioned systems to verify the continued presence of the player. Additionally, in another embodiment, the gaming machine utilizes two or more types of biometric data to verify the continued presence of a first player.

Alternatively in another embodiment, the verification system continuously obtains verification data samples of a target area, regardless of whether a gaming session has been activated. Referring back to FIG. 2A, the verification system obtains a first verification data sample of a target area 22A where no person is present. The verification system continuously obtains samples of the target area at pre-determined intervals. The verification system compares each subsequently obtained verification data sample to the first verification data sample. Alternatively, in another embodiment, the verification system compares the last obtained verification data sample to the next-to-last obtained verification data sample and determines whether the last obtained verification data sample is substantially similar to the next-to-last obtained verification data sample. Optionally, in an alternative embodiment, the verification system compares the last obtained verification data sample to any previously obtained verification data sample.

Referring to FIG. 2B, when a first player 30 positions himself within the target area 22B to play a game on the gaming machine 10, the first player substantially changes the content of the subsequent verification data samples. The verification system recognizes this substantial change in the verification data samples and determines a first player 30 is present at the gaming machine 10. Upon recognizing the presence of the first player 30, the verification system obtains a first verification data sample of the first player 30 positioned in the target area 22B. Subsequent verification data samples of the target area 22B are obtained and compared to the first verification data sample to determine whether or not the first player 30 remains present at the gaming machine.

Alternatively, upon recognizing the presence of a first player, the verification system obtains a first verification data sample of the first player positioned in the target area. The verification system then obtains a second verification data sample of the target area. The second verification data sample is compared to the first verification data sample. If the verification data samples, match then the verification system verifies the continued presence of the first player. The verification system will then obtain a third verification data sample of the target area and compare it to the second verification data sample previously obtained. If the verification data samples match, the verification system determines the first player continues to be present. Next, the verification system obtains a fourth verification data sample to compare to the third verification data sample.

Optionally, in another embodiment, once the verification system recognizes that a player is present, a player welcoming mechanism is activated. The player welcoming mechanism sends a message to the newly recognized first player 30. For example, the player welcoming mechanism may cause a welcome screen to be displayed on the gaming machine 10. Alternatively, the player welcoming mechanism can present a message inviting the first player 30 to insert a player tracking card. Optionally, the player welcoming mechanism presents a coupon or advertisement to the first player. In another embodiment, the player welcoming mechanism presents a drink voucher or meal voucher to the first player. Additionally, the voucher can be printed out for the first player. In another embodiment, the gaming machine 10 comprises a message window for presenting messages to the player. The player welcoming mechanism can present messages to the player on the message window.

In an alternative embodiment, once the verification system recognizes that a player or person is present, the gaming machine changes into a different mode. For example, the gaming machine may go into an attract mode to entice the recognized person to play a game on the gaming machine.

Optionally the player verification system is not limited to being used on a gaming machine. Rather, the player verification system may be implemented and used to verify the presence of a player at a game table.

Optionally, the verification system may be used to verify the presence of an operator or user of any type of machine or device. Once a device is activated for operation, a first verification data sample is obtained. The verification data sample is information relating to one or more physical features of a first user. The verification data sample may include, but is not limited to, a thermal image, image from a camera, image from a video camera, electronic field image, retinal scan, iris scan, voice sample, fingerprint image, weight measurement and other types of biometric data samples known by those skilled in the art.

During operation of the device, one or more additional verification data samples are obtained. Each subsequently obtained verification data sample is compared to a previously obtained verification data sample. If the subsequent verification data sample is substantially similar to the previously obtained verification data sample, then the device determines that the same first user is operating the device. If the subsequent verification data sample is not substantially similar to the previously obtained verification data sample, then the device cannot verify that the first user is still operating the device. Accordingly, the operation of the device may be suspended and/or an alarm may sound. Optionally, in another embodiment, if the device cannot verify the first user is still present, the device may obtain another verification data sample to confirm the absence or presence of the first user.

For example, in one embodiment, the user is a truck driver of hazardous materials and the device is a truck. The truck driver first "checks out" a truck before leaving the truck depot. The truck will not start without a network connection and verification of the truck driver. The verification system obtains a first verification data sample from the driver. Then, a second verification data sample is obtained. If the second verification data sample is substantially similar to the first verification data sample, the system verifies that the same truck driver is driving the truck. If the second verification data sample is not substantially similar to the first verification data sample, the system cannot verify that the same truck driver is driving the truck. The verification system continues to periodically obtain verification data samples from the truck driver. The last obtained verification data sample is compared to a previously obtained verification sample.

Additionally, in alternative embodiments the verification system may be used in any situation where it is advantageous or necessary to continuously verify that the same user remains present, or that the same first user is present.

In one example, a verification system or device is used in connection with an automated teller machine (ATM). When a first user operates an ATM, the verification system triggers a device to continuously capture verification data samples from the first user. The last obtained verification data sample is analyzed to determine whether it is substantially similar to a previously obtained verification data sample. If the data samples are substantially similar, the system verifies the same ATM user continues to be present at the ATM.

In another example embodiment, the verification system is used in test taking situations to verify the continued presence of the same test taker. In one example, a verification system or device may be used in connection with the administration by the Office of Enrollment and Discipline (OED) of the Exam for Registration to Practice in Patent Cases Before the USPTO. In this example, as the testing session commences, a verification data sample is obtained from a first test taker. During the test session, subsequent verification data samples are obtained from the first test taker. Each subsequently obtained verification data sample is compared to a previously obtained verification data sample. If the subsequently obtained verification data sample is substantially similar to the previously obtained verification data sample, the system verifies that the same first test taker continues to be present at the testing session.

Optionally, in another embodiment a verification device is provided. The verification device comprises a communication means for operatively connecting to one or more gaming machines. Such means may include, but is not limited to, a USB connection, a wireless network connection, or any other means for operatively coupling components together. Additionally, the verification device includes a means for continuously obtaining verification data samples. Such means include, but are not limited to, an infrared camera, a camera, a video camera, an image capturing device, a retinal scanner, an iris scanner, a voice recorder, a fingerprint sensor, a weight sensing device, a biometric data sampling device, or the like.

The verification device stores a designated reference template in a storage means, such as a hard drive, flash memory or other solid-state, non-volatile memory such as, but not limited to, EPROM, EEPROM, or DRAM. Additionally, at least one processor analyzes the verification data sample and determines whether it is substantially similar to the designated reference template. In one embodiment the same processor updates the reference template as necessary. In an optional embodiment, a separate processor updates the reference template.

Figure 3:
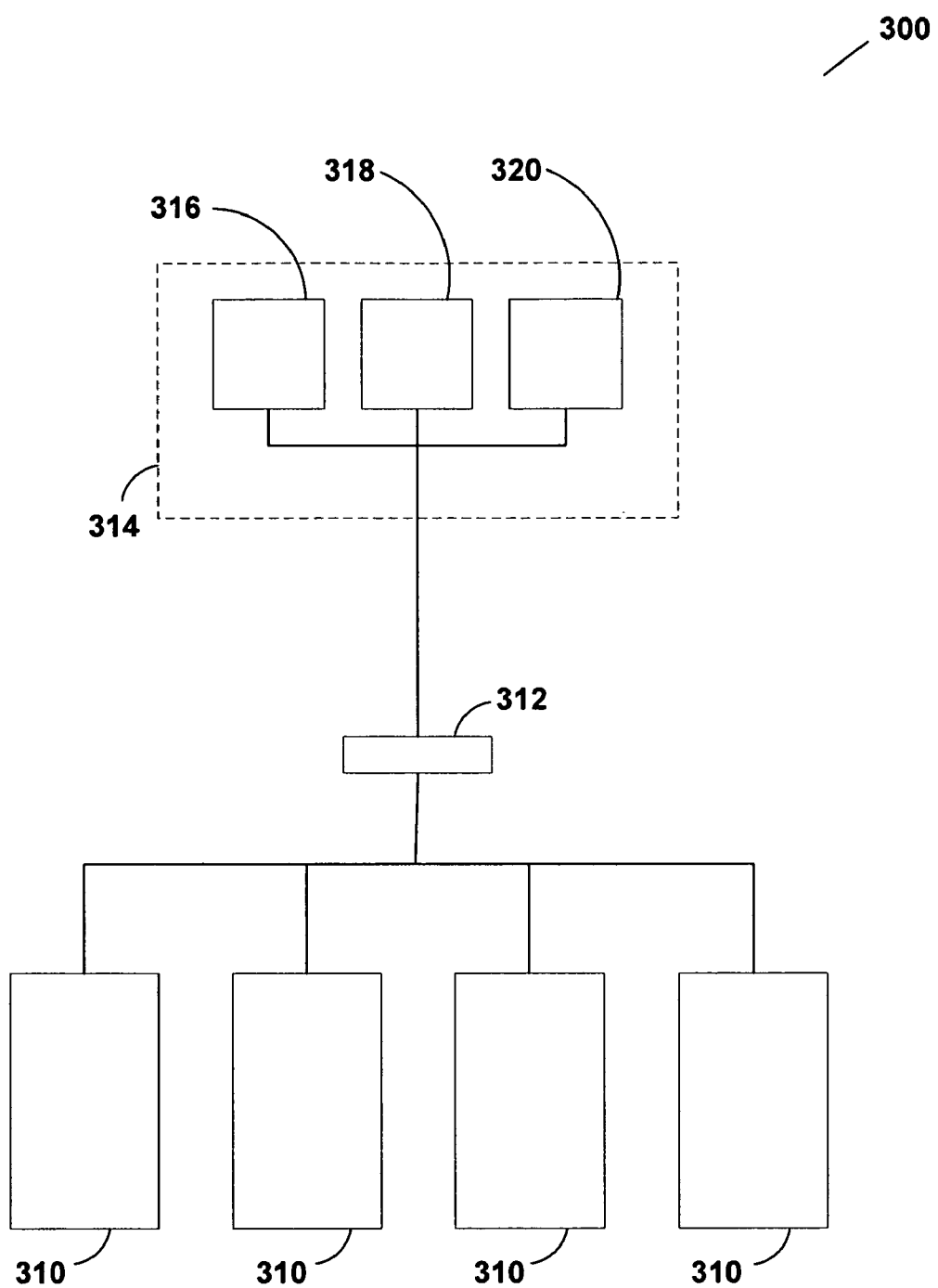
FIG. 3 is an illustration of a casino gaming system comprising an embodiment of a continued presence verification system.

Optionally, the verification system may be used to verify the presence of an authorized user, such as a casino employee. Referring now to FIG. 3, a verification system for use in a casino gaming system 300 is illustrated. The casino gaming system 300 comprises one or more gaming machines 310. The gaming machines 310 may be any type of electronic or mechanical gaming devices. Examples include, but are not limited to, the S6000 mechanical reel spinner and the Alpha video slot machine from Bally Gaming.

The gaming machines 310 are connected via a network to a network bridge 312, which is used for networking, routing and polling gaming machines, including slot machines. The network bridge 312 connects to a back end system 314 that comprises a slot floor controller 316, a casino management server 318 and a casino database 320. The slot floor controller 316 is a part of the player tracking system for gathering accounting, security and player specific information. The casino management server 318 and casino database 320 work together to store and process player specific information such as password, biometric identification, player card identification and biographic data. Additionally, the casino management server 318 and casino database 320 store information related to casino employees including biographic data, biometric information, job level and rank, passwords, authorization codes and security clearance levels.

Generally, a casino operator or attendant inserts a card into a card slot on a gaming machine 310. Typically, the card has a magnetic stripe to hold an identifying data specific to the attendant. Alternatively, the card may be a 'smart card' or electronic button having integrated circuits for storage and processing of user data. The attendant may optionally key in a password or be asked for a fingerprint or other biometric identifying information. This string of information is then sent through the casino gaming system 300 to the back end system 314 to determine whether the attendant is authorized to have access to the casino gaming system 300. If the system authorizes the attendant, the verification system then captures a first verification data sample of the attendant via a means described above. The verification system continues to capture verification data samples to determine that whether the authorized attendant remains present at the gaming device 310. Alternatively, the casino gaming system 300 may also authenticate a user.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A method for verifying the continued presence of a player during a gaming session, the method comprising:
    providing a gaming machine having a thermal imager, wherein the thermal imager periodically obtains thermal images of a target area adjacent to the gaming machine;
    activating a gaming session on the gaming machine;
    receiving information that identifies a first player via a player tracking card or player input;
    obtaining a first thermal image of the target area, wherein the first player is positioned within the target area;
    designating the first thermal image as a reference image;
    obtaining a second thermal image of the target area during the gaming session;
    analyzing the second thermal image to determine whether the second thermal image is substantially similar to the reference image, said analysis ignoring the identity of said first player; and
    if the second thermal image is substantially similar to the reference image, then determining that the first player continues to be present during the gaming session, updating the reference image by designating the second thermal image as the reference image, and continuing to obtain subsequent thermal images.

2. The method of claim 1, further comprising:
    analyzing each subsequently obtained thermal image to determine whether a particular subsequent thermal image is substantially similar to the reference image, and if a particular subsequent thermal image is substantially similar to the reference image, then determining that the first player continues to be present during the gaming session and updating the reference image by designating the particular subsequent thermal image as the reference image.

3. The method of claim 1, further comprising suspending the gaming session if the second thermal image is not substantially similar to the reference image.

4. The method of claim 3, further comprising notifying a casino representative that the gaming session has been suspended.

5. The method of claim 1, wherein if the second thermal image is not substantially similar to the first thermal image, determining that a second player, different from the first player, is present at the gaming machine.

6. The method of claim 1, wherein if the second thermal image is not substantially similar to the first thermal image, determining that no player is present at the gaming machine.

7. The method of claim 1, wherein analyzing the second thermal image further comprises applying digital image processing techniques to the second thermal image.

8. The method of claim 7, further comprising applying digital image processing techniques to the reference image.

9. The method of claim 1, wherein the second thermal image is determined to be substantially similar to the reference image if the second verification data sample is at least 90% similar to the reference image.

10. The method of claim 1, wherein the second thermal image is determined to be substantially similar to the reference image if the second verification data sample is at least 80% similar to the reference image.

11. The method of claim 1, wherein the second thermal image is determined to be substantially similar to the reference image if the second verification data sample is at least 70% similar to the reference image.

12. The method of claim 1, wherein the second thermal image is determined to be substantially similar to the reference image if the second verification data sample is at least 51% similar to the reference image.

* * * * *